(12) United States Patent
Vida

(10) Patent No.: US 6,863,002 B2
(45) Date of Patent: Mar. 8, 2005

(54) RAILWAY CONTAINER TRANSHIPMENT DEVICE

(76) Inventor: László Vida, Bethlen G.u.4/E, H-1188 Budapest (HU)

( * ) Notice: Subject to any disclaimer, the term of this patent is extended or adjusted under 35 U.S.C. 154(b) by 0 days.

(21) Appl. No.: 10/451,154

(22) PCT Filed: Sep. 24, 2001

(86) PCT No.: PCT/HU01/00094

§ 371 (c)(1),
(2), (4) Date: Jun. 27, 2003

(87) PCT Pub. No.: WO02/053441

PCT Pub. Date: Jul. 11, 2002

(65) Prior Publication Data

US 2004/0045475 A1 Mar. 11, 2004

(30) Foreign Application Priority Data

Dec. 28, 2000 (HU) .............................................. 0005012

(51) Int. Cl.[7] .............................................. B61D 17/00
(52) U.S. Cl. ......................... 105/404; 212/233; 414/460
(58) Field of Search ..................... 105/404, 3; 212/233, 212/234, 258, 124, 16.4; 414/460, 342; 280/638; 104/27

(56) References Cited

U.S. PATENT DOCUMENTS

| | | |
|---|---|---|
| 3,637,100 A | 1/1972 | McMillan |
| 3,993,202 A * | 11/1976 | Neitzel .......................... 414/282 |
| 4,465,414 A * | 8/1984 | Theurer et al. ............... 414/21 |
| 5,688,100 A * | 11/1997 | Wunder et al. .............. 414/547 |

FOREIGN PATENT DOCUMENTS

| | | |
|---|---|---|
| DE | 1531990 | 3/1970 |
| DE | 2521087 | 12/1975 |
| DE | 2855665 | 6/1980 |
| EP | 0438998 | 7/1991 |
| GB | 2015970 | 9/1979 |
| HU | 214170 | 1/1998 |
| WO | 96/17797 | 6/1996 |
| WO | 97/03014 | 1/1997 |
| WO | WO0128836 A1 * | 4/2001 |
| WO | 01/28836 | 4/2001 |

* cited by examiner

*Primary Examiner*—Frantz F. Jules
(74) *Attorney, Agent, or Firm*—Hershkovitz & Assoc.; Abe Hershkovitz (57) ABSTRACT

Railway container transhipment device for moving a container, wherein the device includes two underframes. Each underframe includes a crane unit, whereby the crane units are adapted to cooperate with one another. Each of the two crane units include a lower boom, and upper boom, a lower moving gear adapted to move the lower boom, an upper moving gear adapted to move the upper boom, and a lifting element arranged on the upper boom. An axial moving unit connects the two underframes and is adapted to adjust a distance between the two underframes. When the two crane units move the container, the railway container transhipment device is capable of adjusting an angle of movement of each of the two crane units which is proportional to the distance between the two underframes. This abstract is not intended to define the invention disclosed in the specification, nor intended to limit the scope of the invention in any way.

34 Claims, 7 Drawing Sheets

RAILWAY CONTAINER TRANSHIPMENT DEVICE

CROSS-REFERENCE TO RELATED APPLICATIONS

The present application is a National Stage Application of International Application No. PCT/HU01/00094, filed Sep. 24, 2001. Further, the present application claims priority under 35 U.S.C. § 119 of Hungarian Patent Application No. P 0005012 filed on Dec. 28, 2000.

BACKGROUND OF THE INVENTION

1. Field of the Invention

The invention is directed to a railway container transhipment device, comprising—preferably two—underframes, an elevating mechanism fixed to the underframe and container clamping elements.

2. Discussion of Background Information

Due to environmental protection reasons, it is a primary goal of the European countries to direct a part of road freight traffic to the railway lines. One problem with this is that at the present it is quite difficult to take over the containers from camions to freight-wagons and from freight-wagons to camions. The containers are most commonly taken over using overhead traveling cranes. The cranes usually lift the containers from the top, which has significant disadvantages in case of electrical railway lines, as these cranes can not be used in case of electrical railway lines. It these cases the wagons are pulled to a railway track with no electrical wire by a diesel locomotive for taking the containers over, which is quite time-consuming and requires significant energy. There are several types of side-lift trucks and loaders as well. These are used where there are no cranes available. Their disadvantage is that they also lift the containers into significant height, so they can not be used with electrical lines. A further disadvantage of the trucks and side loaders is that they can not easily move between the rails and that they can work only at one side.

U.S. Pat. No. 3,637,100 introduces a fork-lift truck, the fork unit of which can be tilted and moved in three dimensions. However, this truck of high mobility can not be suitably used at railway tracks, it can be primarily used in smaller storerooms. Specification DE 2,521,087 describes a self-contained loader device that can be placed on the platform of the transporting vehicle. The loader device is situated on rails fixed on the vehicle. It is a disadvantage of this construction that each transporting vehicle should be supplied with such a device, which would involve unreasonable expenses. Patent specification DE 2,855,665 presents a solution where the containers are taken over by a mechanism with supporting rollers. The camion must range closely to the railway wagon, and the container is translated by rolls of the same level. It is a disadvantage of this solution that it is uncomfortable, and also, each vehicle should be equipped with a mechanism with supporting rollers, which is quite expensive.

Patent specification DE 1,531,990 describes a container handling apparatus which is fixed on a vehicle supplied with wheels, and equipped with an elevating mechanism moving along on rails protruding from the vehicle at its two sides. The elevating mechanism is working between the carrying rails. Its disadvantage is that the containers can only be taken over in restricted circumstances, as the rails carrying the elevating mechanism are situated at the two sides of the container, which also means that the apparatus is only suitable for taking over containers standing alone. However, containers are usually placed close to each other on vehicles, so this apparatus can not be used there.

Patent specifications HU 214,170 and WO 97/03.014 present a container elevating and moving vehicle that can be used at electrical railway lines as well. The vehicle is a double-sided side-loading device with a parallel-moving container catching frame. For taking over a container to the other side the container must be put down, and than the elevating mechanism must be got through under the container so as to catch the container again. The container can be placed on the other transporting vehicle afterwards. It is a disadvantage of this method that the containers can only be caught at their side, therefore it can only be applied with containers that are supplied with catch-holes on their side. It is also disadvantageous that it has several parallel telescopes and surfaces moving near each other, and it is very difficult and expensive to prevent them from dirt and to ensure precise parallelism. This mechanism is not commonly used in practice.

Patent specification WO 01/28.836 published after our priority date presents an improvement of the above mechanism. This mechanism is suitable for catching the container from the top as well with a protruding beam. Similarly to the above one, this mechanism can only be moved parallel to the co-ordinate axis, resulting in several disadvantages. It can only load vehicles standing exactly parallel to the rails. It contains flat sliding mechanisms, where there is significant friction and abrasion, and the mechanism may got stuck. In order to avoid getting stuck, the structure must be very stable and solid from the mechanical point of view, as no elastic deformation is allowed either. The massive structure increases the weight and the cost of the apparatus. It is also disadvantageous that in case of interim placement, the container is supported not at its corner piece, increasing the probability of damage. For taking over a container to the other side the container must be caught again, which increases the cycle time. In case of a container of 8.5 tons, there will be a torque of 22 mt at the end of the upper beam, as a result of which the beam is slightly bent, resulting in a slightly tilted position of the container, which makes the exact positioning of the container more difficult. It also makes the exact positioning of the container difficult that the stabilizer mechanism is not supplied with rolls, therefore no longitudinal adjustment is possible after the container has been caught. The required mid-distance of the rails is 5 meters.

SUMMARY OF THE INVENTION

The present invention aims to eliminate the disadvantages of the existing mechanisms and to develop a railway container transhipment device which can operate at electrical railway tracks as well, which can catch the container from the top as well, which is reliable, can quickly load in both directions. The position of the container is easily adjustable. The container can be positioned very accurately, and the invention can be applied with different types of containers.

The fundamental idea of the invention is that if space-saving and cooperating crane units and underframe units are connected in a way that they can move relative to each other, the resulting mechanism will be better than the known ones.

In accordance with the desired target, the railway container transhipment device according to the invention, comprising—preferably two—underframes, an elevating mechanism fixed on the underframe and container clamping elements, is designed in a way that the elevating mechanism comprises two—preferably mirrorsymmetric—crane units suitable for cooperating with each other, the crane unit comprises a bogie, a lower boom and an upper boom, a lower moving gear and an upper moving gear and a lifting element, the underframes are connected to each other by an axial moving unit, and the angle between the top-view longitudinal axis of the crane unit elevating the container and the longitudinal axis of the container transhipment device is proportional to the distance between the underframes.

It can be a further characteristic feature of the invention that a stand unit is situated between the underframes, suitable for temporarily supporting the container. The stand unit has supporting wheels which supporting wheels bear up on the same railtrack as the wheels of the underframes.

At one embodiment there are connecting elements between the underframes situated parallel with the railtrack, the connecting elements pass through one underframe, while they are fixed to the other underframe. The connecting element is joined to the longitudinal supporting unit situated on the railtrack.

At another possible embodiment the lifting element is connected to the upper boom by a hinged member, and is in connection with the clamping element, or, in certain cases, with the suspension unit. The suspension unit-has a hinged or telescopic suspension arm and catch elements suitable for fixing the lower part of an exchangeable superstructure.

It may also be a characteristic feature that the length of the lower boom can be telescopically varied. The lower moving gear and the upper moving gear include a hydraulic working cylinder or a screw spindle. There is a transversal supporting unit connected to the underframe suitable for bearing up on a supporting rail running parallel to the railtrack.

The railway container transhipment device according to the invention has a plenty of advantages. It facilitates railway trucking getting more and more popular. It can be operated even at railtracks with electric trolley wire. The small length of lifting of containers reduces the general safety hazard connected to lifting. It can be manufactured at lower cost as compared to the known container transhipment devices. Its operation is also more favorable as loading can highly be automatized. It is especially favourable that there is no need for building special loading areas or container terminals, and that there is no need for a diesel locomotive.

Further advantageous features are that the container is lifted over to the other side in one stage, the position of the container can easily be adjusted, making accurate positioning possible, the mechanism is not sensitive to elastic deformations, and it can be applied even in case of the standard 4 meter mid-distance of rails. There is a possibility to apply roller supports.

The invention also provides for a railway container transhipment device for moving a container, wherein the device comprising two underframes. Each underframe comprises a crane unit, whereby the crane units are adapted to cooperate with one another. Each of the two crane units comprise a lower boom, an upper boom, a lower moving gear adapted to move the lower boom, an upper moving gear adapted to move the upper boom, and a lifting element arranged on the upper boom. An axial moving unit connects the two underframes and is adapted to adjust a distance between between the two underframes. When the two crane units move the container, the railway container transhipment device is capable of adjusting an angle of movement of each of the two crane units which is proportional to the distance between the two underframes.

The two crane units may be adapted to move in a mirrorsymmetric manner. The two crane units may be mirrorsymmetric. The axial moving unit may comprise a telescopic axial moving unit. The device may further comprise a stand unit arranged between the two underframes. The stand unit may be adapted to temporarily support the container. The stand unit may comprise supporting wheels. The supporting wheels may be adapted to bear against a railway. The railway may support wheels arranged on at least one of a bogie and each of the two underframes.

The device may further comprise connecting elements connecting the two underframes. The connecting elements may be arranged parallel to one another. The connecting elements may be arranged parallel to a railway supporting the two underframes. Each connecting element may comprise one end that extends through one of the two underframes and another end that is fixed another of the two underframes. The connecting elements may be coupled to a longitudinal supporting unit. The lifting element may be connected to the upper boom via a hinged member.

The device may further comprise a clamping element coupled to the lifting element. The device may further comprise a suspension unit coupled to the lifting element. The suspension unit may comprise one of a hinged suspension arm and a telescopic suspension arm. The suspension unit may further comprise catch elements adapted to engage a lower part of an exchangeable superstructure. The device may further comprise a transversal supporting unit coupled to at least one of the two underframes, whereby the transversal supporting unit is adapted to bear against a supporting rail which runs parallel to a railway that supports the two underframes.

The invention also provides for a method of moving a container from a first side of the railway container transhipment device described above to a second side of the railway container transhipment device, wherein the method comprises rotating each of the two crane units in a direction of the first side, lifting the container with the two crane units, rotating the two crane units while also moving the two underframes away from each other, rotating each of the two crane units in a direction of the second side, and releasing the container from the two crane units.

The invention also provides for a railway container transhipment device for moving a container, wherein the device comprises a first underframe comprising a first crane unit and wheels for moving over a railway. A second underframe comprises a second crane unit and wheels adapted for moving over the railway. Each of the first and second crane units comprises a rotatably mounted lower boom, an upper boom movably connected to the lower boom, and a lifting device arranged on the upper boom. A moving unit is adapted to move the first and second underframes towards and away from each other to thereby adjust a distance between the first and second underframes.

The first and second crane units may be adapted to move in a mirrorsymmetric manner. The moving unit may comprise a telescopic axial moving unit. The device may further comprise stand units with wheels arranged between the first and second underframes, wherein the stand units are adapted to temporarily support the container. The device may further comprise connecting elements connecting the first and second underframes, wherein the connecting elements are arranged parallel to one another. The device may further comprise a longitudinal supporting unit with wheels, wherein the connecting elements are coupled to the longitudinal supporting unit. The lifting device may be connected to the upper boom via a hinged member. The device may further comprise a clamping element coupled to the lifting device. The device may further comprise a suspension unit coupled to the lifting device. The suspension unit may comprise at least one of a hinged suspension arm, a telescopic suspension arm, and catch elements adapted to engage a lower part of an exchangeable superstructure.

The device may further comprise a transversal supporting unit coupled to each of the first and second underframes, whereby each transversal supporting unit is adapted to bear against a supporting rail which runs parallel to the railway that supports the first and second underframes. The invention also provides for a method of moving a container from a first side of the railway container transhipment device described above to a second side of the railway container transhipment device, wherein the method comprises rotating each of the first and second crane units in a direction of the first side, lifting the container with the first and second crane units, rotating the first and second crane units towards the railway container transhipment device while also moving the first and second underframes away from each other, rotating each of the first and second crane units in opposite directions and in a direction of the second side, and releasing the container from the first and second crane units.

The invention also provides for a railway container transhipment device for moving a container, wherein the device comprises a first underframe comprising a first crane unit and wheels for moving over a railway and a second underframe comprising a second crane unit and wheels adapted for moving over the railway. Each of the first and second crane units comprise a movably mounted lower boom, an upper boom movably connected to the lower boom, and a lifting device arranged on the upper boom. A moving unit is adapted to move the first and second underframes towards and away from each other to thereby adjust a distance between the first and second underframes. Connecting elements connect the first and second underframes. The connecting elements are arranged parallel to one another.

BRIEF DESCRIPTION OF THE DRAWINGS

In what follows, the invention is described in more detail in connection with particular embodiments, with reference to the accompanying drawings in which.

DETAILED DESCRIPTION OF THE INVENTION

Figure 1:
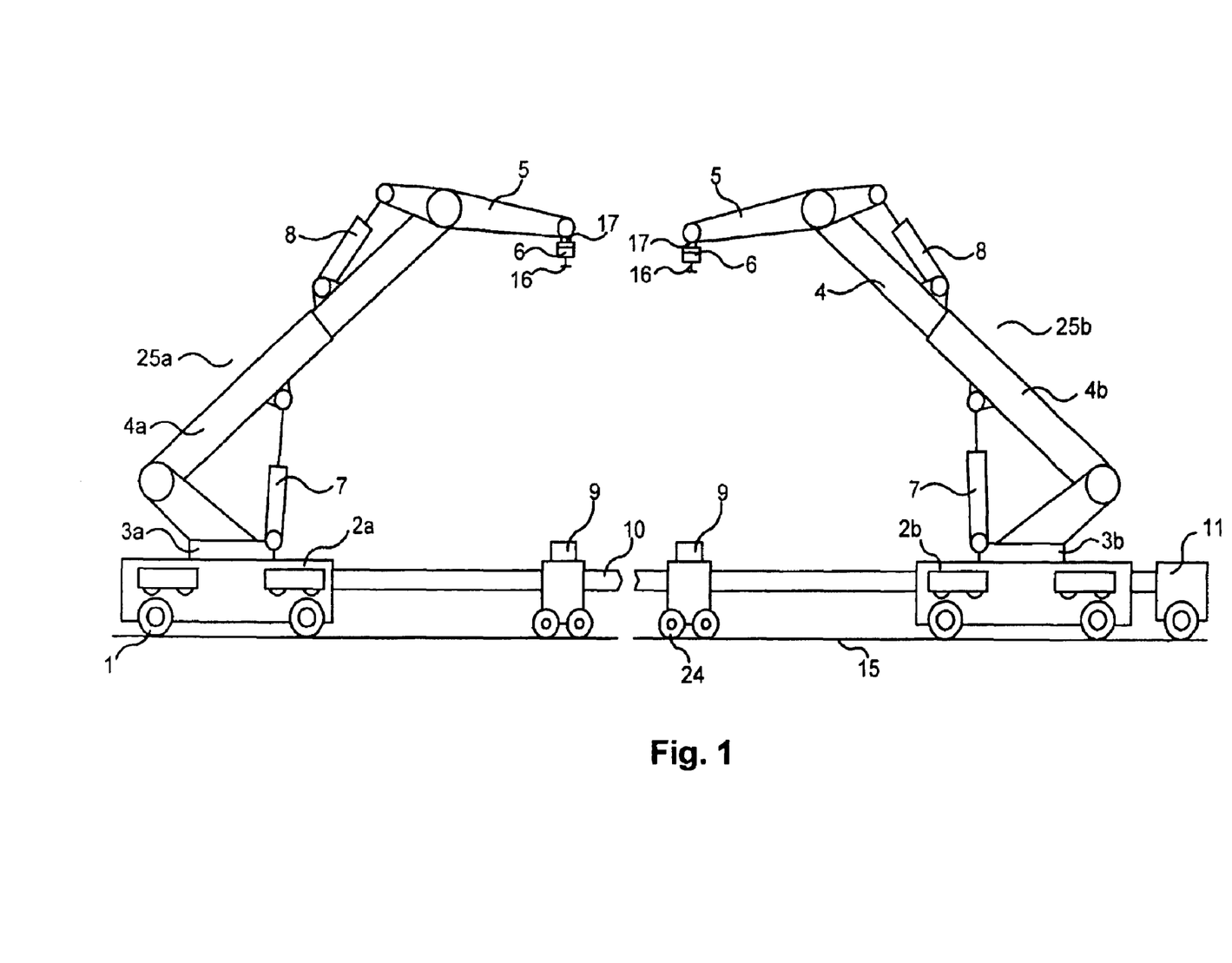
FIG. 1 shows a lateral view of the device.

FIG. 1 shows that the underframe 2a and 2b of the railway container transhipment device according to the invention is situated on the railtrack 15, the space-saving elevating mechanism of which is constituted by the crane units 25a and 25b. The crane units 25a and 25b comprise the bogie 3, the telescopic lower boom 4, the upper boom 5 and the lifting element 6. The lower boom 4 and the upper boom 5 are operated by the lower moving gear 7 and the upper moving gear 8, respectively. The bar-shaped lifting element 6 is connected to the upper boom 5 with the hinged member 17 inserted, which hinged member 17 makes two-way movement of the lifting element 6 possible. The clamping element 16 is connected to the lifting element 6.

There are connecting elements 10 situated between the underframes 2a and 2b parallel with the railtrack 15. The connecting elements 10 are fixed to the underframe 2a, pass through the underframe 2b and join to the longitudinal supporting unit 11. There is a stand unit 9 situated between the underframes 2a and 2b, suitable for temporarily supporting the container. The stand unit 9 with the supporting wheels 24 bear up on the railtrack 15. The lower moving gear 7 and the upper moving gear 8 include hydraulic working cylinders.

Figure 2:
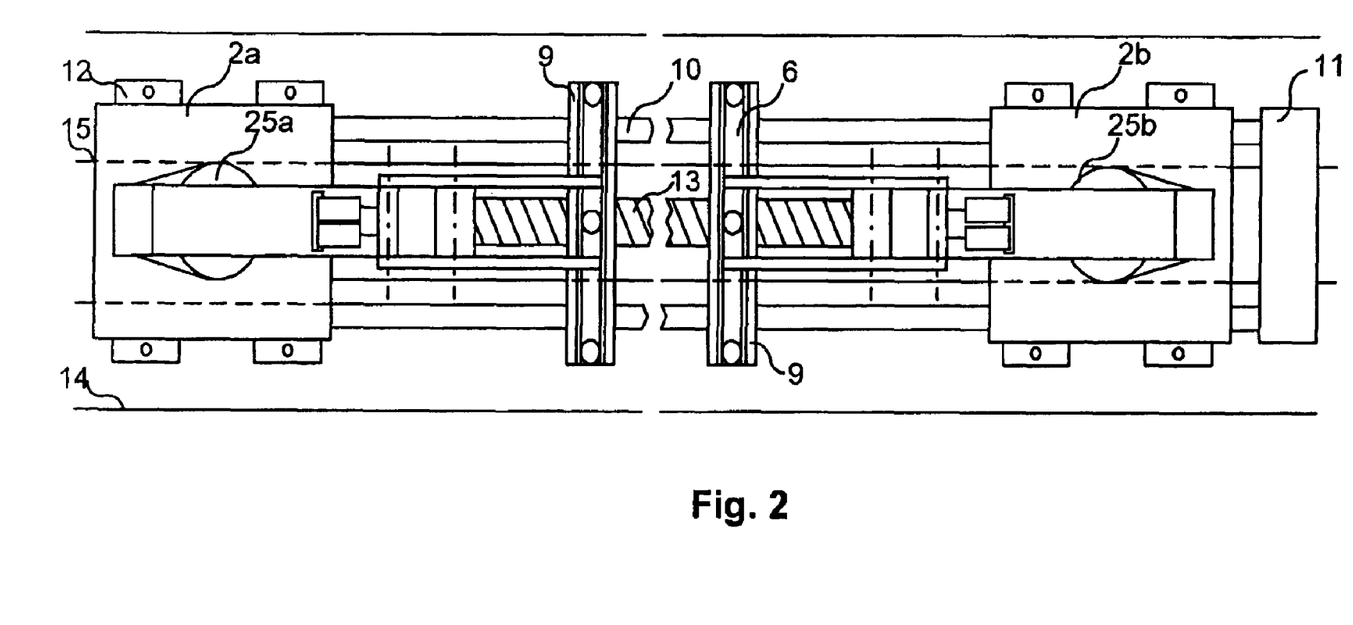
FIG. 2 shows a top view of the device.

FIG. 2 shows the top view of the embodiment presented in FIG. 1. The equipment or device is situated on railtrack 15. Crane unit 25a is on the underframe 2a, crane unit 25b is on the underframe 2b. The underframes 2a and 2b are connected by the telescopic axial moving unit 13 as well. One can see the connecting element 10, the stand unit 9 and the lifting element 6 hanging above them. The stability of the device is ensured by the longitudinal supporting unit 11 and the transversal supporting units 12. The transversal supporting units 12, which can be slipped out from the underframes 2a and 2b, can bear up on the supporting rail 14 running near the railtrack 15. When the crane units 25a and 25b are turning in/out in a mirrorsymmetric way, the axial moving unit 13 increases/decreases the distance between the underframes 2a and 2b. The axial moving unit 13 is suitably a telescopic, hydraulic working cylinder, but it can also be operated by a screw spindle system or by a pulling machine with chain or cable rope.

Figure 3:
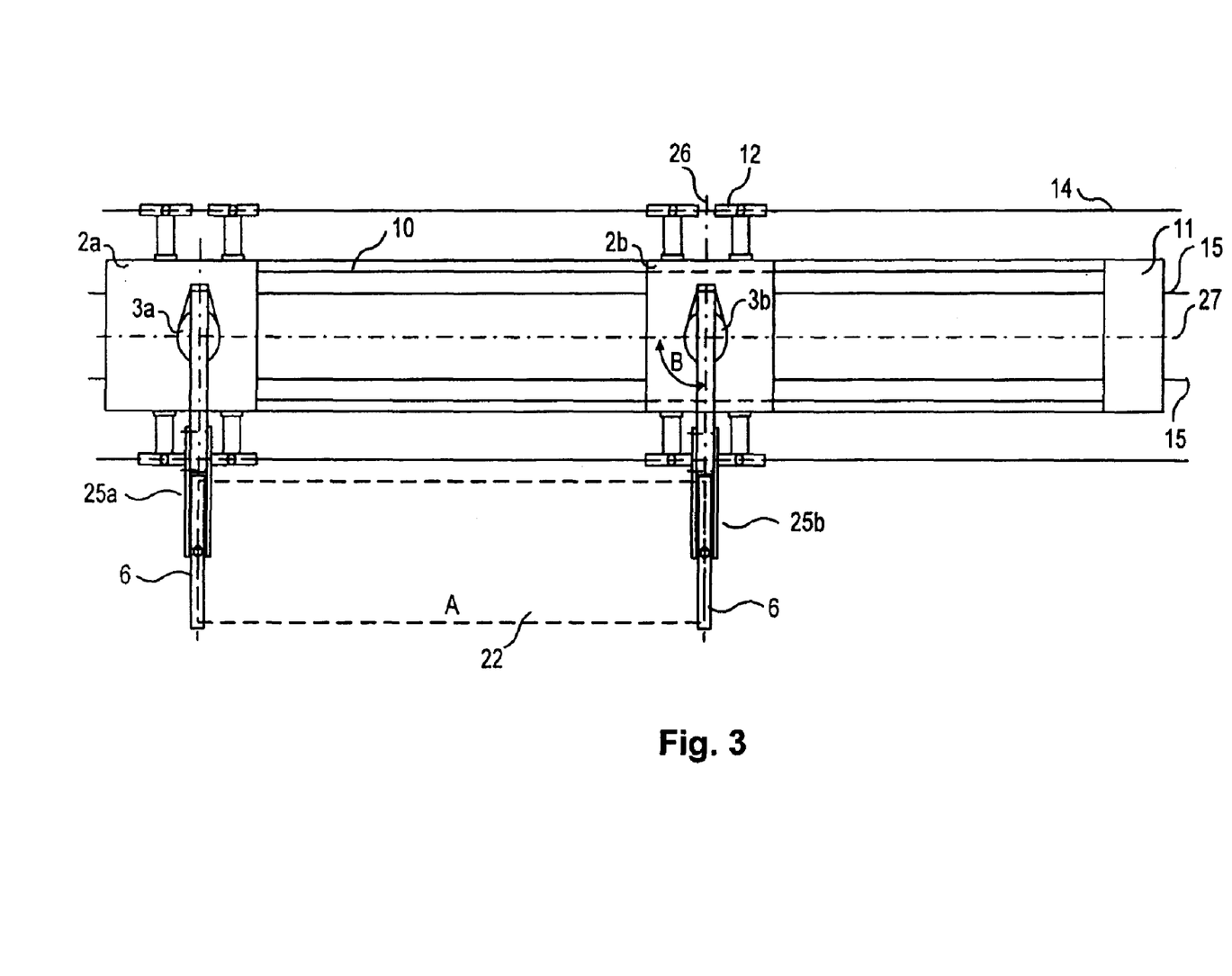
FIG. 3 shows a top view drawing illustrating the catching of the container.
Figure 4:
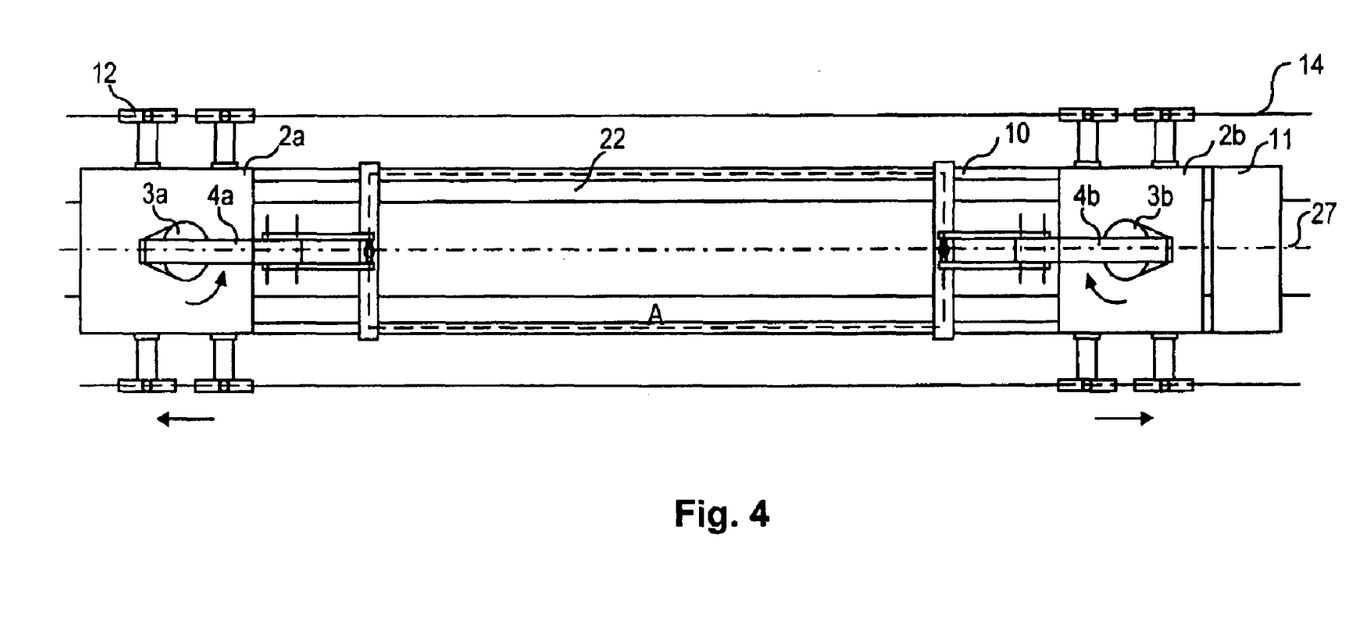
FIG. 4 shows a top view drawing of the elevated container, in its position turned above the device.

FIGS. 3 and 4 show a top view of the device in operation. The device is situated on railtrack 15. In FIG. 3, the container 22 is above the neighbouring railtrack or the road near the railtrack 15. The transversal supporting units 12 are resting on the supporting rail 14 and can revolve on that as well. The crane units 25a and 25b hold the container 22 with the lifting element 6. For this purpose the underframe 2b had to move off or away from the longitudinal supporting unit 11 according to the size of the container 22. The top-view longitudinal axis 26 of the crane unit 25a and 25b is perpendicular to the longitudinal axis 27 of the device. "B" denotes the angle between the longitudinal axes 26 and 27. "A" denotes the distance between the underframes 2a and 2b.

When the container 22 is lifted over, the crane units 25a and 25b turn on the bogie 3 in opposite directions, suitably turning inside in a mirrorsymmetric way, while the underframe 2b, due to the geometrical constraint path, is moving backward towards the longitudinal supporting unit 11. If necessary, the underframe 2a is moving in the opposite direction. The underframes 2a and 2b are moved by the axial moving unit 13. During the movement, the transversal supporting units 12 are also rolling, even if loaded. Angle "B" between the top-view longitudinal axis 26 of the crane units 25a and 25b lifting the container 22 and the longitudinal axis 27 of the device is proportional to distance "A" between the underframes 2a and 2b. In FIG. 4 the container 22 is completely turned above the device. In this position the distance between the underframes 2a and 2b is the largest.

Figure 5:
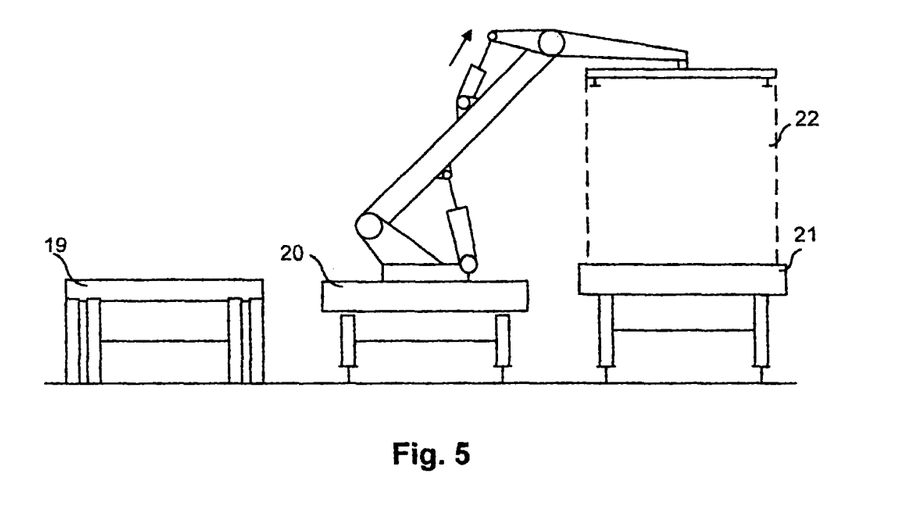
FIGS. 5–9 show the stages of taking over the container from the front view.
Figure 6:
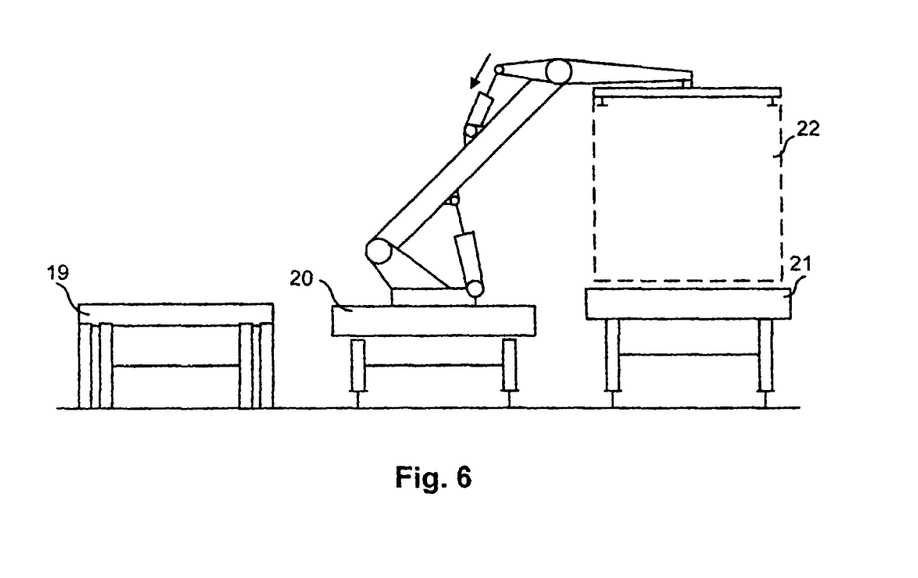
Figure 7:
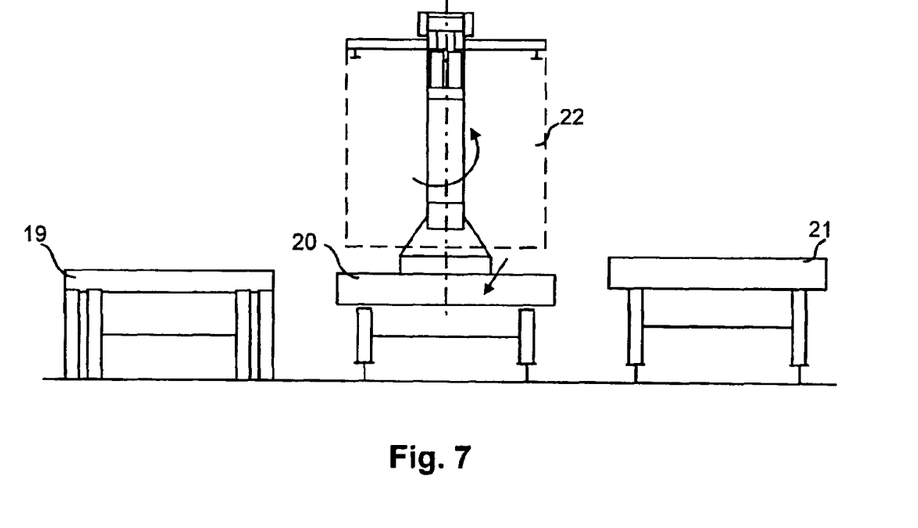
Figure 8:
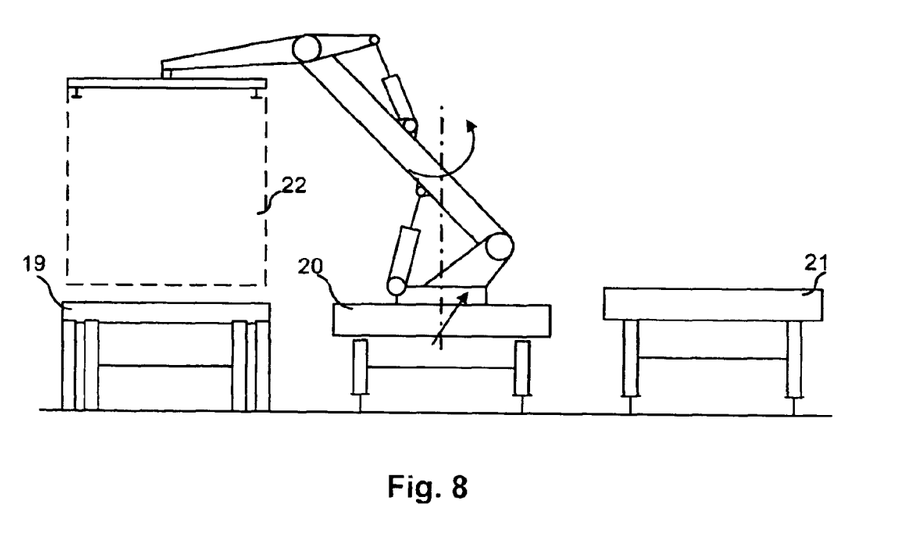
Figure 9:
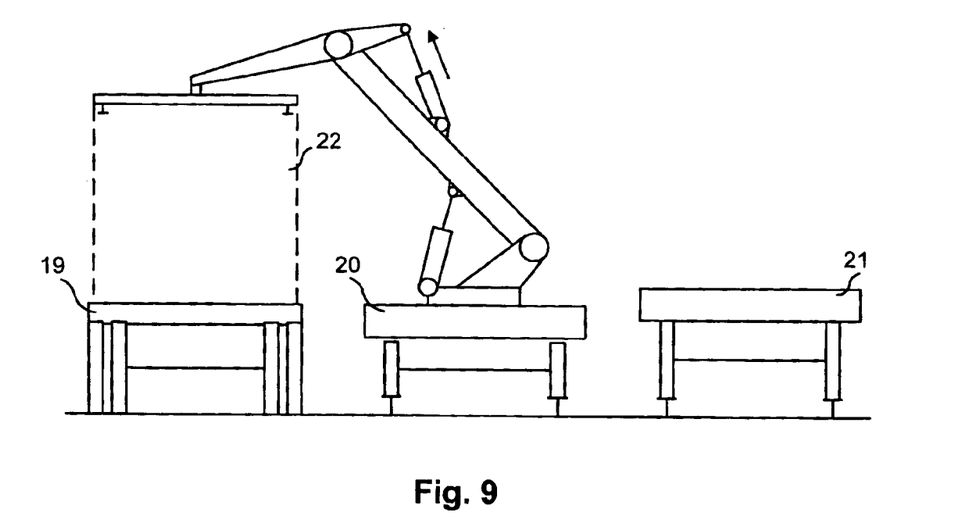

FIGS. 5–9 show the road transporting vehicle 19, the container transhipment device 20, the container 22 and the railway transporting vehicle 21. In FIG. 5, the container 22 is caught on the railway transporting vehicle 21, in FIG. 6 it is lifted. At this example, the container 22 is caught by the lifting frame situated above the container 22. It can be seen that the height of the container transhipment device 20 is only slightly exceeding the height of the container 22, so it keeps a safe distance from the electric trolley wire. In FIG. 7, the container 22 is turned to be above the container transhipment device 20, and in FIG. 8 it is lifted over the road transporting vehicle 19, and in FIG. 9 the container 22 is put on the road transporting vehicle 19.

Figure 10:
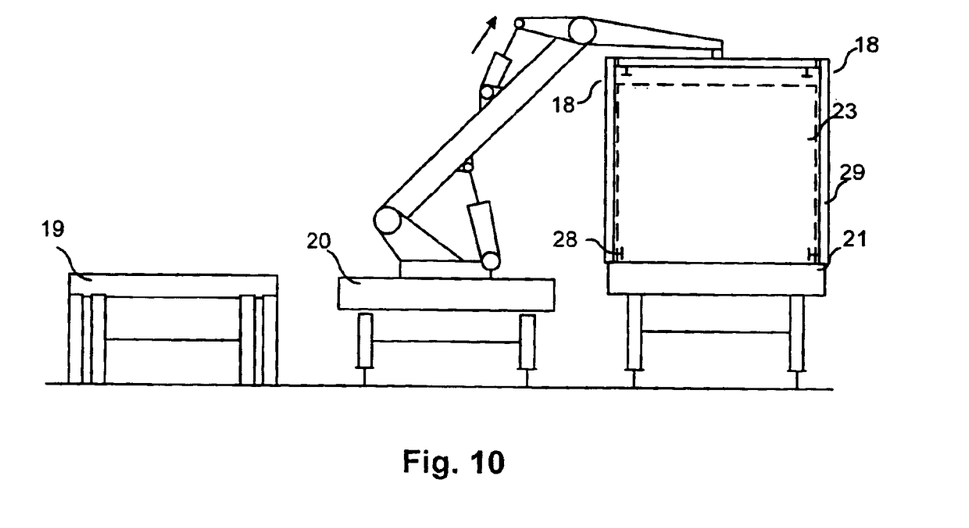
FIG. 10 shows a schematic drawing of catching the exchangeable superstructure with the suspension unit.

FIG. 10 shows an embodiment with exchangeable superstructure 23, and the catching of the exchangeable superstructure 23 is shown. The exchangeable superstructures 23 are structures used in combined road and railway transport, that have only bottom corner pieces of standardized size and distance. These can be caught and lifted by the suspension unit 18. The suspension unit 18 has a hinged or telescopic suspension arm 29 and catch elements 28.

The railway container transhipment device according to the invention is suitable for lifting over any kind of containers of usually 3–12 m length. The containers can be placed on each other if required. If the device has to put down the container on any reason, e.g. for carrying it as a vehicle, the container can be placed on the stand unit 9 by tilting the upper boom 5. The lifting elements 6 are primarily suitable for catching corner pieces meeting the ISO standard at the upper holes. The bottom corner pieces can be lifted by the catch elements 28 at the side holes. The revolving units of the elevating mechanisms are hydromotors, working cylinders or revolving electric machines, in combination with driving gears if necessary.

Several other embodiments of the railway container transhipment device according to the invention can be implemented within the scope of the invention.

What is claimed is:

1. A railway container transhipment device for moving a container, the device comprising:
   a first underframe comprising a first crane unit and wheels for moving over a railway;
   a second underframe comprising a second crane unit and wheels adapted for moving over the railway;
   each of the first and second crane units comprising a movably mounted lower boom, an upper boom movably connected to the lower boom, and a lifting device arranged on the upper boom;
   a moving unit adapted to move the first and second underframes towards and away from each other to thereby adjust a distance between the first and second underframes; and
   connecting elements connecting the first and second underframes,
   wherein the connecting elements are arranged parallel to one another.

2. The device of claim 1, wherein each of the first and second crane units comprise a rotation platform.

3. A railway container transhipment device for moving a container, the device comprising:
   two underframes;
   each underframe comprising a crane unit, whereby the crane units are adapted to cooperate with one another;
   each crane unit comprising a lower boom, an upper boom, a lower moving gear, an upper moving gear, and a lifting element;
   an axial moving unit connecting the two underframes and being adapted to adjust a distance between the two underframes; and
   a stand unit arranged between the two underframes,
   wherein, when the two crane units move the container, the railway container transhipment device is capable of adjusting an angle of movement of each of the two crane units which is proportional to the distance between the two underframes.

4. The device of claim 3, wherein the two crane units are adapted to move in a mirrorsymmetric manner.

5. The device of claim 3, wherein the two crane units are mirrorsymmetric.

6. The device of claim 3, wherein the axial moving unit comprises a telescopic axial moving unit.

7. The device of claim 3, wherein the stand unit is adapted to temporarily support the container.

8. The device of claim 3, wherein the stand unit comprises supporting wheels.

9. The device of claim 8, wherein the supporting wheels are adapted to bear against a railway.

10. The device of claim 9, wherein the railway supports wheels arranged on at least one of a bogie and each of the two underframes.

11. The device of claim 3, wherein the lifting element is connected to the upper boom via a hinged member.

12. The device of claim 11, further comprising a clamping element coupled to the lifting element.

13. The device of claim 3, further comprising a clamping element coupled to the lifting element.

14. The device of claim 3, further comprising a suspension unit coupled to the lifting element.

15. The device of claim 14, wherein the suspension unit comprises one of a hinged suspension arm and a telescopic suspension arm.

16. The device of claim 15, wherein the suspension unit further comprises catch elements adapted to engage a lower part of an exchangeable superstructure.

17. The device of claim 3, further comprising a transversal supporting unit coupled to at least one of the two underframes, whereby the transversal supporting unit is adapted to bear against a supporting rail which runs parallel to a railway that supports the two underframes.

18. A railway container transhipment device for moving a container, the device comprising:
   two underframes;
   each underframe comprising a crane unit, whereby the crane units are adapted to cooperate with one another;
   each crane unit comprising a lower boom, an upper boom, a lower moving gear, an upper moving gear, and a lifting element;
   an axial moving unit connecting the two underframes and being adapted to adjust a distance between the two underframes; and
   connecting elements connecting the two underframes,
   wherein, when the two crane units move the container, the railway container transhipment device is capable of adjusting an angle of movement of each of the two crane units which is proportional to the distance between the two underframes.

19. The device of claim 18, wherein the connecting elements are arranged parallel to one another.

20. The device of claim 18, wherein the connecting elements are arranged parallel to a railway supporting the two underframes.

21. The device of claim 20, wherein each connecting element comprises one end that extends through one of the two underframes and another end that is fixed to another of the two underframes.

22. The device of claim 20, wherein the connecting elements are coupled to a longitudinal supporting unit.

23. A method of moving a container from a first side of a railway container transhipment device to a second side of the railway container transhipment device, wherein the railway container transhipment device comprises:

two underframes;

each underframe comprising a crane unit, whereby the crane units are adapted to cooperate with one another;

each crane unit comprising a lower boom, an upper boom, a lower moving gear, an upper moving gear, and a lifting element; and an axial moving unit connecting the two underframes and being adapted to adjust a distance between the two underframes, wherein, when the two crane units move the container, the railway container transhipment device is capable of adjusting an angle of movement of each of the two crane units which is proportional to the distance between the two underframes, the method comprising:

rotating each of the two crane units in a direction of the first side;

lifting the container with the two crane units;

rotating the two crane units while also moving the two underframes away from each other;

rotating each of the two crane units in a direction of the second side; and releasing the container from the two crane units.

24. A railway container transhipment device for moving a container, the device comprising:

a first underframe comprising a first crane unit and wheels for moving over a railway;

a second underframe comprising a second crane unit and wheels adapted for moving over the railway;

each of the first and second crane units comprising a rotatably mounted lower boom, an upper boom movably connected to the lower boom, and a lifting device arranged on the upper boom;

a moving unit adapted to move the first and second underframes towards and away from each other to thereby adjust a distance between the first and second underframes; and stand units with wheels arranged between the first and second underframes, wherein the stand units are adapted to temporarily support the container.

25. The device of claim 24, wherein the first and second crane units are adapted to move in a mirrorsymmetric manner.

26. The device of claim 24, wherein the moving unit comprises a telescopic axial moving unit.

27. The device of claim 24, wherein the lifting device is connected to the upper boom via a hinged member.

28. The device of claim 24, further comprising a clamping element coupled to the lifting device.

29. The device of claim 24, further comprising a suspension unit coupled to the lifting device.

30. The device of claim 29, wherein the suspension unit comprises at least one of a hinged suspension arm, a telescopic suspension arm, and catch elements adapted to engage a lower part of an exchangeable superstructure.

31. The device of claim 24, further comprising a transversal supporting unit coupled to each of the first and second underframes, whereby each transversal supporting unit is adapted to bear against a supporting rail which runs parallel to the railway that supports the first and second underframes.

32. A railway container transhipment device for moving a container, the device comprising:

a first underframe comprising a first crane unit and wheels for moving over a railway;

a second underframe comprising a second crane unit and wheels adapted for moving over the railway;

each of the first and second crane units comprising a rotatably mounted lower boom, an upper boom movably connected to the lower boom, and a lifting device arranged on the upper boom;

a moving unit adapted to move the first and second underframes towards and away from each other to thereby adjust a distance between the first and second underframes; and connecting elements connecting the first and second underframes, wherein the connecting elements are arranged parallel to one another.

33. The device of claim 32, further comprising a longitudinal supporting unit with wheels, wherein the connecting elements are coupled to the longitudinal supporting unit.

34. A method of moving a container from a first side of a railway container transhipment device to a second side of the railway container transhipment device, wherein the railway container transhipment device comprises:

a first underframe comprising a first crane unit and wheels for moving over a railway;

a second underframe comprising a second crane unit and wheels adapted for moving over the railway;

each of the first and second crane units comprising a rotatably mounted lower boom, an upper boom connected to the lower boom, and a lifting device arranged on the upper boom; and a moving unit adapted to move the first and second underframes towards and away from each other to thereby adjust a distance between the first and second underframes, the method comprising:

rotating each of the first and second crane units in a direction of the first side;

lifting the container with the first and second crane units;

rotating the first and second crane units towards the railway container transhipment device while also moving the first and second underframes away from each other;

rotating each of first and second crane units in opposite directions and in a direction of the second side; and releasing the container from the first and second crane units.

* * * * *